(12) United States Patent
Anand (10) Patent No.: US 9,275,206 B2
(45) Date of Patent: Mar. 1, 2016

(54) MANAGING SENSITIVE INFORMATION

(71) Applicant: INTERNATIONAL BUSINESS MACHINES CORPORATION, Armonk, NY (US)

(72) Inventor: Srinath Anand, Nashua, NH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 231 days.

(21) Appl. No.: 13/748,104

(22) Filed: Jan. 23, 2013

(65) Prior Publication Data

US 2014/0208225 A1   Jul. 24, 2014

(51) Int. Cl.
*G06F 21/31* (2013.01)
*H04W 12/08* (2009.01)
*G06F 21/30* (2013.01)
*G06F 21/46* (2013.01)
*G06F 21/00* (2013.01)

(52) U.S. Cl.
CPC .............. *G06F 21/31* (2013.01); *G06F 21/00* (2013.01); *G06F 21/30* (2013.01); *G06F 21/46* (2013.01); *G06F 2221/2113* (2013.01); *G06F 2221/2149* (2013.01)

(58) Field of Classification Search
CPC . G06F 21/00; G06F 2221/2149; G06F 21/31; H04L 2463/102; H04L 63/10; H04L 2209/60; H04W 12/06; H04W 12/08; H04W 12/02; G07F 17/3241

USPC .............. 715/741; 726/4, 5, 6, 27, 28, 29, 30
See application file for complete search history.

(56) References Cited

U.S. PATENT DOCUMENTS

| | | | | |
|---|---|---|---|---|
| 5,031,214 A | * | 7/1991 | Dziewit | H04L 9/3247 713/176 |
| 5,729,734 A | * | 3/1998 | Parker | G06F 21/604 |
| 6,834,276 B1 | * | 12/2004 | Jensen | G06F 17/30882 |
| 7,114,075 B1 | * | 9/2006 | Yasuda | H04L 63/0853 713/172 |
| 7,689,920 B2 | * | 3/2010 | Robbin | G07F 17/16 715/716 |
| 7,784,087 B2 | * | 8/2010 | Yami | H04L 63/0428 713/185 |
| 7,854,013 B2 | * | 12/2010 | Dunkley | H04L 9/3247 713/170 |
| 8,806,190 B1 | * | 8/2014 | Munshi | H04L 63/0428 713/153 |
| 8,856,176 B1 | * | 10/2014 | Venu | G06F 17/30 707/783 |
| 8,875,282 B2 | * | 10/2014 | Sinclair | G06F 21/34 713/179 |

(Continued)

FOREIGN PATENT DOCUMENTS

CN   102957708 A   *   3/2013

*Primary Examiner* — Ece Hur
(74) *Attorney, Agent, or Firm* — Paul S. Drake (57) ABSTRACT

A method, system or computer usable program product for securing pages that contain sensitive information including utilizing a processor to provide a user interface on a display allowing a user to select a page as password protected on a device, responsive to a user utilizing the UI to select the page as password protected, receiving a password from the user, and requiring entry of the password before displaying the page on the display.

8 Claims, 6 Drawing Sheets

(56) References Cited

U.S. PATENT DOCUMENTS

| | | | | |
|---|---|---|---|---|
| 9,177,453 B2* | 11/2015 | Gill | | G08B 13/1427 |
| 9,179,316 B2* | 11/2015 | Raleigh | | H04W 12/08 |
| 2001/0041884 A1* | 11/2001 | Frey | | A61F 9/00806 |
| | | | | 606/5 |
| 2002/0099947 A1* | 7/2002 | Evans | | G06F 21/6209 |
| | | | | 713/193 |
| 2002/0188638 A1* | 12/2002 | Hamscher | | G06F 17/243 |
| | | | | 715/255 |
| 2003/0097596 A1* | 5/2003 | Muratov | | G06F 21/31 |
| | | | | 726/26 |
| 2003/0208682 A1* | 11/2003 | Zissimopoulos | | G06Q 20/027 |
| | | | | 713/182 |
| 2004/0095382 A1* | 5/2004 | Fisher | | G06F 9/4443 |
| | | | | 715/744 |
| 2005/0228993 A1* | 10/2005 | Silvester | | G06F 21/32 |
| | | | | 713/168 |
| 2006/0036568 A1* | 2/2006 | Moore | | G06F 17/30126 |
| 2006/0218394 A1* | 9/2006 | Yang | | G06F 21/604 |
| | | | | 713/167 |
| 2006/0288229 A1* | 12/2006 | Hamid | | G06F 21/31 |
| | | | | 713/182 |
| 2006/0294599 A1* | 12/2006 | Sim | | G06F 21/6245 |
| | | | | 726/34 |
| 2007/0016958 A1* | 1/2007 | Bodepudi | | G06F 21/6218 |
| | | | | 726/27 |
| 2007/0022155 A1* | 1/2007 | Owens | | G06Q 10/10 |
| | | | | 709/202 |
| 2007/0039042 A1* | 2/2007 | Apelbaum | | G06F 21/46 |
| | | | | 726/6 |
| 2007/0050432 A1* | 3/2007 | Yoshizawa | | G06F 15/16 |
| | | | | 708/130 |
| 2007/0055754 A1* | 3/2007 | Robbin | | G07F 17/16 |
| | | | | 709/223 |
| 2007/0143324 A1* | 6/2007 | Eichhorst | | G06F 3/04817 |
| 2007/0177740 A1* | 8/2007 | Nakajima | | G06F 21/6218 |
| | | | | 380/277 |
| 2008/0059448 A1* | 3/2008 | Chang | | G06F 17/30707 |
| 2009/0049296 A1 | 2/2009 | Kent, Jr. et al. | | |
| 2009/0214034 A1 | 8/2009 | Mehrotra et al. | | |
| 2009/0221267 A1* | 9/2009 | Bender | | G06F 21/554 |
| | | | | 455/412.2 |
| 2009/0240841 A1* | 9/2009 | Fisher | | G06F 9/4443 |
| | | | | 710/13 |
| 2009/0282248 A1* | 11/2009 | Dias | | G06F 21/6218 |
| | | | | 713/170 |
| 2009/0327365 A1* | 12/2009 | Donaldson | | G06F 17/30115 |
| 2010/0138311 A1* | 6/2010 | Pieraldi | | G06Q 50/18 |
| | | | | 705/26.1 |
| 2011/0105193 A1* | 5/2011 | Lee | | G06F 3/0488 |
| | | | | 455/566 |
| 2011/0296174 A1* | 12/2011 | Nakayama | | H04L 69/04 |
| | | | | 713/162 |
| 2011/0307695 A1 | 12/2011 | Slater | | |
| 2011/0320477 A1* | 12/2011 | Nestler | | G06F 9/4443 |
| | | | | 707/769 |
| 2014/0320391 A1* | 10/2014 | Bazaz | | H04W 52/0277 |
| | | | | 345/156 |

* cited by examiner

MANAGING SENSITIVE INFORMATION

BACKGROUND

1. Technical Field

The present invention relates generally to managing sensitive information, and in particular, to a computer implemented method for securing sensitive information with password protection.

2. Description of Related Art

Mobile devices such as mobile phones, tablets, notebooks and laptops are rapidly expanding in use and function. The number of mobile phone subscriptions in developed nations is approaching 100%, with many of those mobile phones being smartphones. Smartphones allow users to perform a variety of tasks including internet browsing, picture taking, email communications, and even point of sale purchases. In addition, notebooks, tablets and other mobile devices are also widely used to perform many of the same tasks as mobile phones, but typically with a larger user interface display and often with different input devices such as a keyboard. As a result of the utilization of these mobile devices, users are able to remotely perform more tasks than ever before.

SUMMARY

The illustrative embodiments provide a method, system, and computer usable program product for securing pages that contain sensitive information including utilizing a processor to provide a user interface on a display allowing a user to select a page as password protected on a device, responsive to a user utilizing the UI to select the page as password protected, receiving a password from the user, and requiring entry of the password before displaying the page on the display[Insert Final Claim 1].

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

DETAILED DESCRIPTION

Processes and devices may be implemented and utilized to secure sensitive information with password protection. These processes and apparatuses may be implemented and utilized as will be explained with reference to the various embodiments below.

Figure 1:
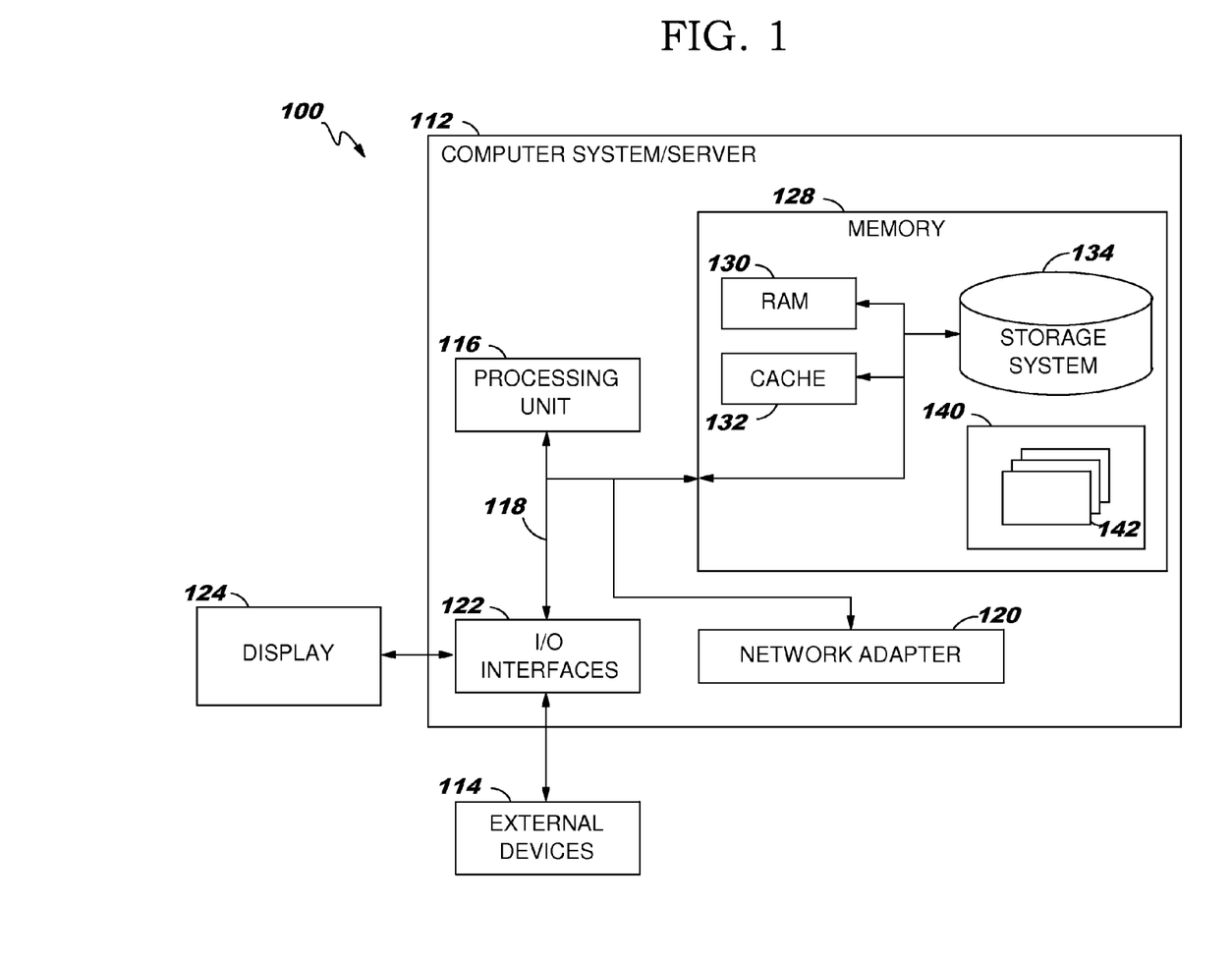
FIG. 1 is a block diagram of a data processing system in which various embodiments may be implemented.

FIG. 1 is a block diagram of a data processing system in which various embodiments may be implemented. Data processing system 100 is one example of a suitable data processing system and is not intended to suggest any limitation as to the scope of use or functionality of embodiments of the invention described herein. Regardless, data processing system 100 is capable of being implemented and/or performing any of the functionality set forth herein.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available persistent media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of embodiments of the invention. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention. For example, a program module may be software for securing sensitive information with password protection.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
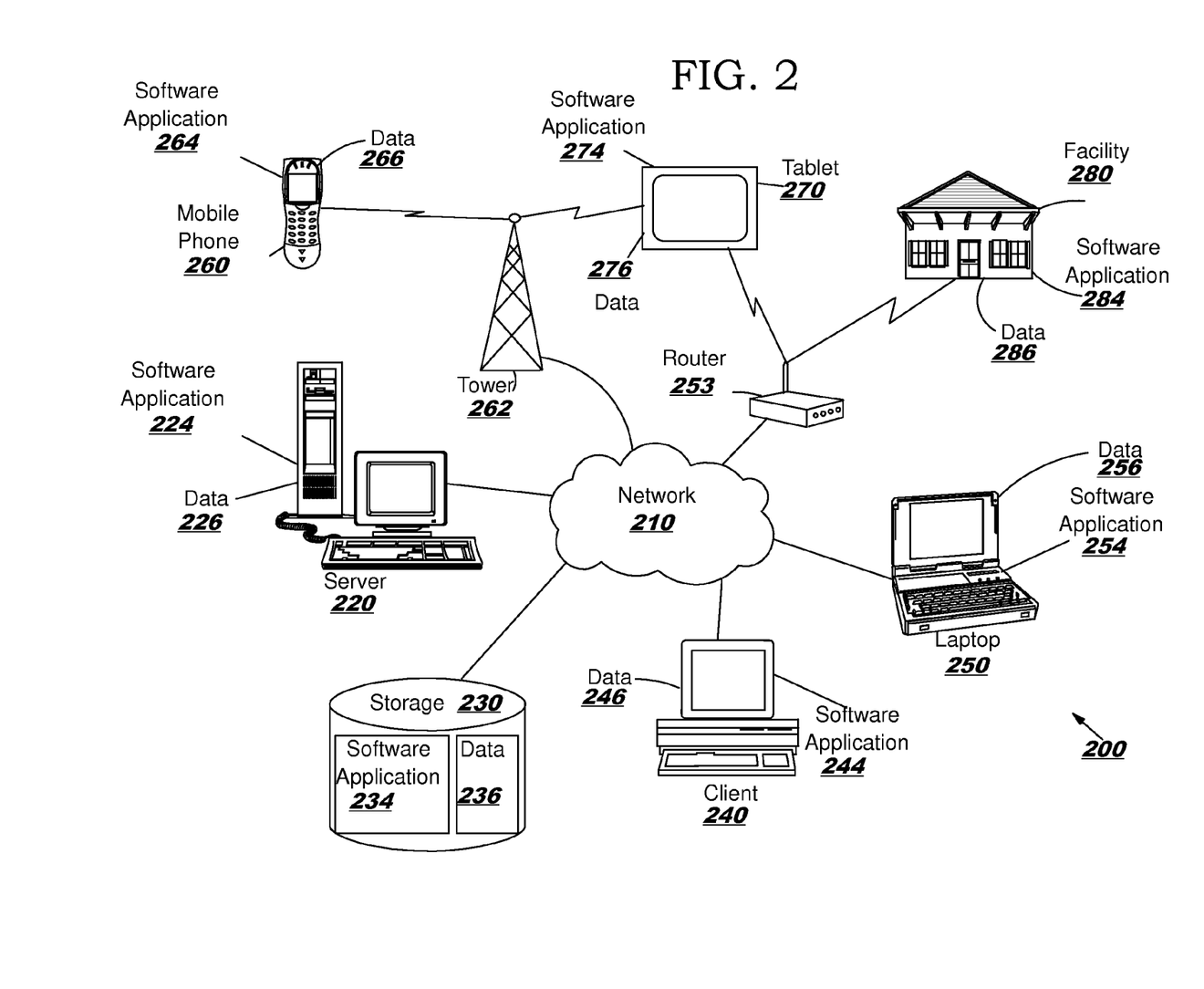
FIG. 2 is a block diagram of a network of data processing systems in which various embodiments may be implemented.

FIG. 2 is a block diagram of a network of data processing systems in which various embodiments may be implemented. Data processing environment 200 is a network of data processing systems such as described above with reference to FIG. 1. Software applications may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250, tablet 270 and facility 280 (such as a home or business) are coupled to network 210 including wirelessly such as through a network router 253. A mobile phone 260 and tablet 270 may be coupled to network 210 through a mobile phone tower 262. Data processing systems, such as server 220, client 240, laptop 250, mobile phone 260, tablet 270 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for securing sensitive information with password protection or other software applications and data in accordance with embodiments described herein. Storage 230 may contain software application 234 and a content source such as data 236 for securing sensitive information with password protection. Other software and content may be stored on storage 230 for sharing among various computer or other data processing devices. Client 240 may include software application 244 and data 246. Laptop 250 and mobile phone 260 may also include software applications 254 and 264 and data 256 and 266. Tablet 270 and facility 280 may include software applications 274 and 284 and data 276 and 286. Other types of data processing systems coupled to network 210 may also include software applications. Software applications could include a web browser, email, or other software application that can secure sensitive information with password protection.

Server 220, storage unit 230, client 240, laptop 250, mobile phone 260, tablet 270 and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240, laptop 250 and tablet 270 may be clients to server 220 in this example. Client 240, laptop 250, mobile phone 260, tablet 270 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

The following figures are for illustrating the use of an additional layer of security for applications and data on a device such as a cell phone, tablet, notebook or laptop. Often mobile devices have a password for initial access, but that password may be fairly simple to break and the use of that password may be easily observed every time the user accesses the device. As a result, if the device is borrowed, lost or stolen, sensitive information on that device may be easily accessed. The use of an extra layer of security for such sensitive data is then desirable.

Figure 3:
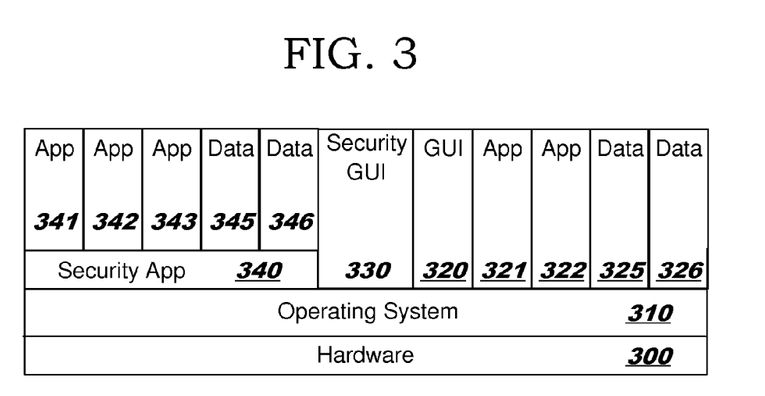
FIG. 3 is a block diagram of a software hierarchy for a data processing system in which various embodiments may be implemented.

FIG. 3 is a block diagram of a software hierarchy for a data processing system in which various embodiments may be implemented. An operating system 310 provides an interface between various software and data and the underlying hardware 300 such as a smartphone or other mobile device. A user may communicate with a graphical user interface (GUI) 320 which provides front of screen graphics for the user to interact with such as through a touch screen display. The graphical user interface then communicates with operating system (OS) 310 to manage the actions indicated by the user through the user interface. The operating system may cause applications (Apps) 321 and 322 to perform certain actions, and those actions may require the use of certain data 325 and 326. Many other applications or data items may be included on this data processing system. The applications may be document processing software, calendaring software, internet browsing software, or any of a myriad of applications available today. The data may be documents, appointments, pictures, or any of a myriad of types of data that may be utilized by applications. Collectively applications and data and other types of information such as a link to a website represented by an icon or a displayed screen may be referred to herein as pages.

The user may also utilize a security graphical user interface 330 to manage security for certain sensitive applications and data. That security is managed with a security application 340 which may be tightly coupled with security GUI 330. That security includes requiring the user to provide a password or other security measures before utilizing pages such as applications (Apps) 341, 342, or 343 as well as data 345 and 346. Many other applications or data items may be secured. The secured applications may be document processing software, calendaring software, internet browsing software, or any of a myriad of applications available today. The secured data may be documents, appointments, pictures, or any of a myriad of types of data that may be utilized by applications, secured or not.

Operating systems, such as with mobile devices often have a standard interfaces for applications and data to enable an aftermarket for system usability and possibly additional revenue generation. As a result, one of ordinary skill may generate a layer between the operating system and applications and data based on these standard interfaces. This could also enable the use of encryption of applications and data to provide additional security. Alternatively, although the security graphical user interface and the security application are shown as layers on top of the operating system, they could also be incorporated into the operating system. In another alternative, the security could be another application running on the operating system but not in direct contact with the protected applications and data, but through the operating system. This may require a priority setting with the operating system for secure implementation.

The user may select a page such as an application or certain data for extra security measures through the use of security GUI 330. An example of this is shown in FIGS. 5A and 5B below. Once the user has selected the security parameters, then the security application provides an interface between the operating system and those pages. That is, before secure applications and data are accessed, certain security measures are required in accordance with the user preferences. When an icon is displayed identifying the secure pages, that icon may be have a small lock, key or other symbol overlay identifying that application or data as secure and requiring the use of a password such as shown in FIGS. 4A and 4B below.

Figure 4A:
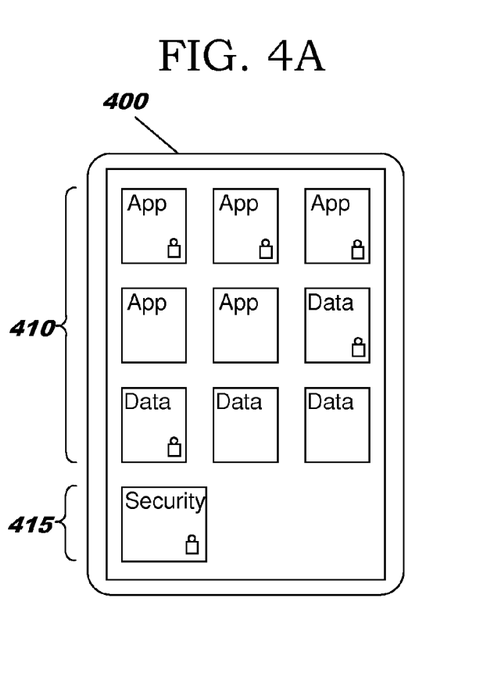
FIGS. 4A and 4B are front of screen diagrams illustrating the utilization of the security application on a mobile phone in which various embodiments may be implemented.
Figure 4B:
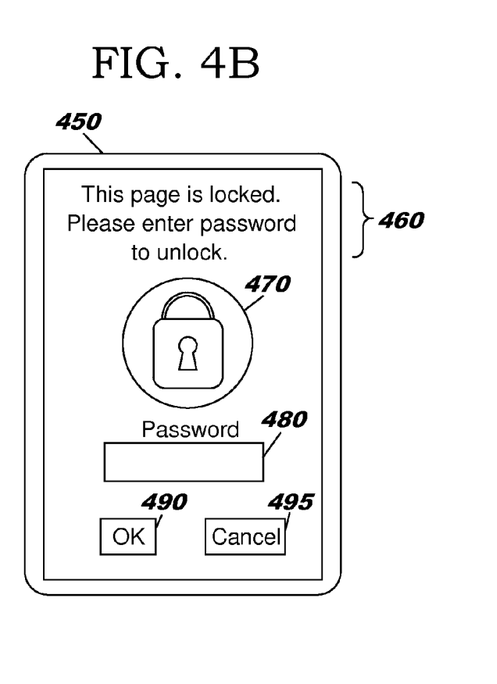
Figure 5A:
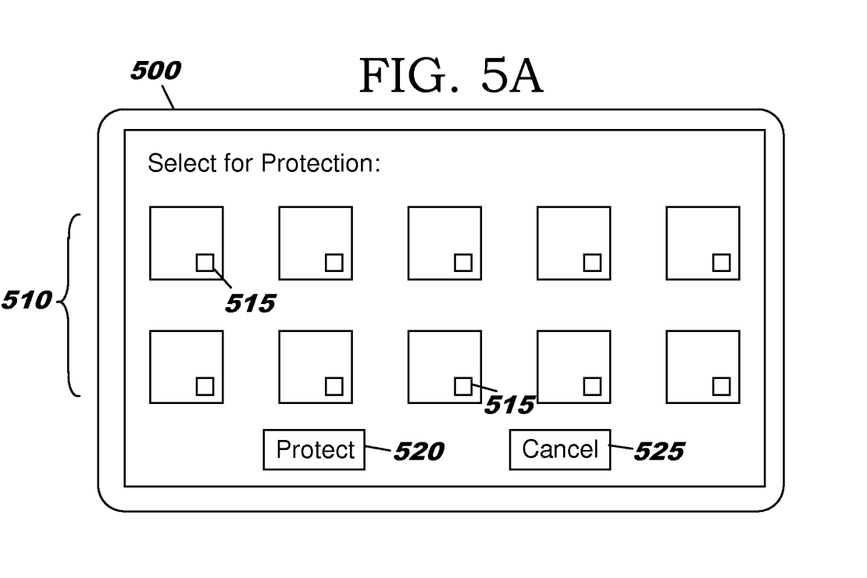
FIGS. 5A and 5B are front of screen diagrams illustrating utilization of the security GUI on a mobile phone in accordance with a first and a second embodiment.
Figure 5B:
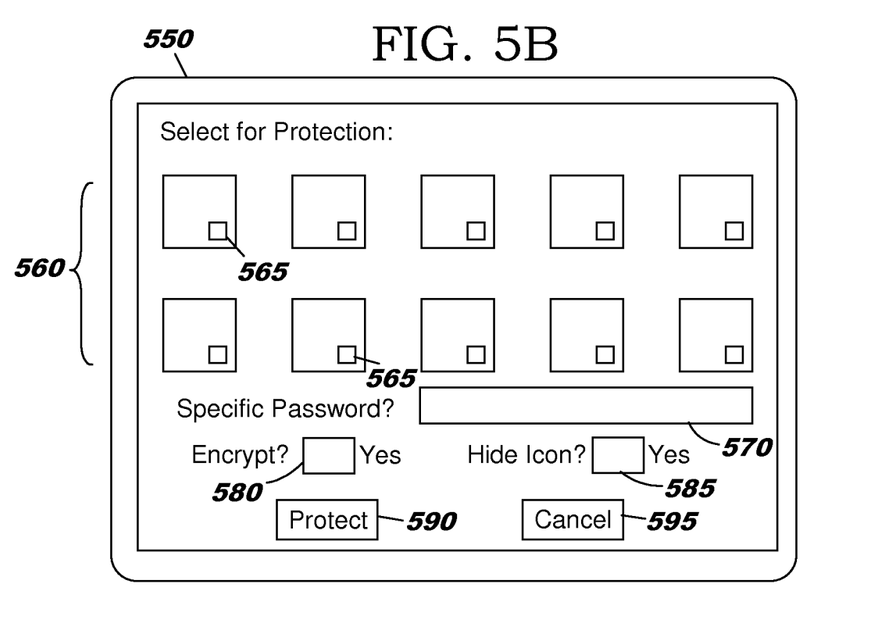

FIGS. 4A and 4B are front of screen diagrams illustrating utilization of the security application on a mobile phone in which various embodiments may be implemented. Although FIGS. 4A and 4B illustrate this embodiment on a mobile phone, it could easily be adapted for use on other devices such as tablets, notebooks and laptops.

FIG. 4A is directed to a front of screen diagram 400 illustrating a mobile phone in a portrait mode with a set of icons 410, some of which may be sensitive and secured pages such as applications or data. For example, one of the applications may be for accessing a bank account such as for generating payments to certain vendors. The user may determine that the application may be particularly sensitive and require a password to access that application. For another example, one of the applications may be a document processing program and one of the data items may be a document such as a personal financial statement. The user may determine that the personal financial statement document may be particularly sensitive and require a password to access that document. Those applications and data items deemed sensitive have a small lock symbol overlay on the bottom of the appropriate icon in this embodiment. Alternative symbol overlays may be utilized, or no overlay at all. Also shown is a security icon for invoking the security GUI 415 as described below with reference to FIGS. 5A and 5B. As shown, the use of this security GUI is also a secure application with a small lock overlay.

All secure icons are shown mixed with non-secure icons. However, the secure icons may be hidden from view until the user logs into the security application. This may be based on the configuration of the device or it may be an option selectable by the user such as for each icon individually as shown with reference to FIG. 5B below.

FIG. 4B is directed to a front of screen diagram 450 illustrating a mobile phone in a portrait mode with a password entry screen. This screen appears when the user accesses a sensitive application or data item such as by tapping an icon with a small lock overlay. This screen includes text 460, a large logo 470, a password entry field 480 and buttons 490 and 495. Text 460 and large logo 470 provide an explanation of the need for a password. Password field 480 provides a location for entering a password. In the case of a mobile phone with a touch sensitive display, the user may tap the password field and a typewriter field may appear for the user to type in the password. When completed, the user may tap OK button 490. Alternatively, the user may tap Cancel button 495 to cancel access to the sensitive application or data.

In case the user forgets a password, the user may request the password be emailed or otherwise sent to the user. In such a case, the user may be asked one or more personal questions such as favorite pet, first car, etc. Once the personal question(s) are accurately answered, then the password is sent to the user. The user may prefer that the password be sent to an email that can only be accessed by use of a different password. For example, the email account may be secured on the mobile device with a general password. However, if the user has forgotten the general password, the email account may also be accessible from another system such as a personal computer that utilizes a different security scheme and password to access. As a result, the emailed password is safely protected, yet is accessible without the forgotten password.

FIGS. 5A and 5B are front of screen diagrams illustrating utilization of the security GUI on a mobile phone in accordance with a first and a second embodiment. Although a graphical user interface is shown, a non-graphical user interface (UI) may also be utilized. The user may select the security icon such as shown in FIG. 4A to invoke the security GUI. Once invoked, a general password may be required to access the security GUI such as through a password entry screen such as shown in FIG. 4B above. The first time the security GUI is accessed, the user is required to provide a password for future accesses of the security GUI.

FIG. 5A is directed to a simplified and very user friendly version of security protection for sensitive data such as applications and data. In this embodiment, applications or data are simply marked as sensitive and a general password may be used to unlock those selected for such protection. A display such as a tablet in a landscape mode 500 is shown with a set of icons 510. The icons represent pages such as applications and data accessible by the device operating system. Each icon has a selection box 515 for selection by the user by simply finger tapping that location on the screen. The user can then slide the icons to the left or right to access more icons for selection. Once the user has selected the icons representing the applications and data for additional security protection, the user presses protect button 520 to implement that security. If the user wishes to cancel the selection, the user simply presses cancel button 525. Although FIGS. 5A and 5B are shown for selecting existing application or data items, similar screens and selections may be provided when the user first loads an application, updates an application, or saves a data item.

Once the user selects protect button 520, then the page icons selected will be protected using the general password also used to access the security GUI. This is accomplished by moving the applications and data from direct access with the operating system to access through the security application. The applications and data may also be encrypted depending on the configuration implemented. Access may be granted to any protected application or data by the user entering the general password using the interface shown in FIG. 4B above. The user may need to enter the password once per session (period of user access of the device without timing out or otherwise locking the device) or for each access of an application or data item, depending on the configuration implemented.

FIG. 5B is directed to a more robust and configurable version of security protection for sensitive pages such as applications and data. In this embodiment, applications or data are marked as sensitive and the user is given various options for security protection. A display such as a tablet in a landscape mode 550 is shown with a set of icons 560. The icons represent applications and data accessible by the device operating system. Each icon has a selection box 565 for selection by the user by simply finger tapping that location on the screen. The user can then slide the icons to the left or right to access more icons for selection.

Once the user has selected an icon representing the application or data for additional security protection, the user can then select security details. For example, the user may enter a password specific to that application or data item in box 570. If not specific password is provided, then the general password will be required to access that application or data item. In addition, the user can request that the application or data be encrypted by selecting box 580. Although encryption provides additional protection, it may slow the utilization of that application or data item. Furthermore, the user can select box 585 so that the page icon be hidden from view unless the user logs into the security application such as shown in FIG. 4B above. With such a selection, an unauthorized user of the device may not even see that page icon. For example, if the user has an account with XYZ bank and an application icon for accessing that bank appears on an unsecure screen of the device, then an unauthorized user will be aware that the account exists and may redouble their efforts to guessing the password. Finally, once the user has selected the security options, the user may implement the options by pressing protect button 590 to implement that security. If the user wishes to cancel the selection, the user simply presses cancel button 595.

Once the user selects protect button 590, then the page icons selected will be protected according to the security protections selected by the user. This is accomplished by moving the applications and data from direct access with the operating system to access through the security application. The applications and data may be encrypted depending on the user selection. Access may be granted to any protected application or data by the user entering a specific password or the general password, depending on the user selection, using the interface shown in FIG. 4B above. The user may need to enter the password once per session (period of user access of the device without timing out or otherwise locking the device) or for each access of an application or data item, depending on the configuration implemented. Additional security protections may be provided for user selection or automatically implemented.

Figure 6:
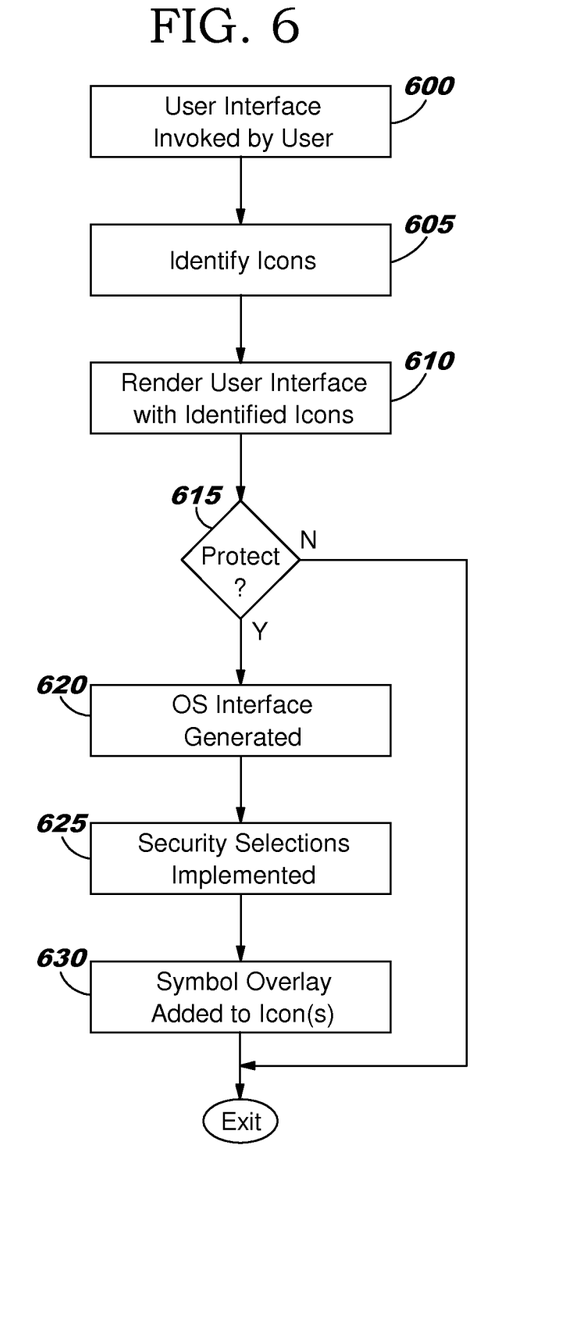
FIG. 6 is a flow diagram of the security GUI in operation in which various embodiments may be implemented.

FIG. 6 is a flow diagram of the security GUI in operation in which various embodiments may be implemented. In a first step 600 when the security GUI is invoked by the user, the user interface is generated. In a second step 605, icons of the various pages (e.g., applications and data) available for security protection are identified. In a third step 610, the user interface is rendered with the identified icons for user selection. The user can then makes selections of one or more icons and also provide additional security selections if those are provided by the security GUI. In step 615, if the user presses the protect button, then processing continues to step 620, otherwise processing ceases.

In step 620, the security GUI then works with the security application to provide an interface between the operating system and the application(s), data item(s) or page(s) selected. Subsequently in step 625, the security selections by the user or predefined by the system are implemented. This can include securely storing an individual password for a specific application or data item, encrypting the application(s) or data item(s), etc. Thereafter in step 630, an overlay with a small lock symbol or other symbol is added to the icon for the selected application(s) or data item(s). The security GUI processing then ceases until needed when the secured application or data item is accessed by the user or another application.

Figure 7:
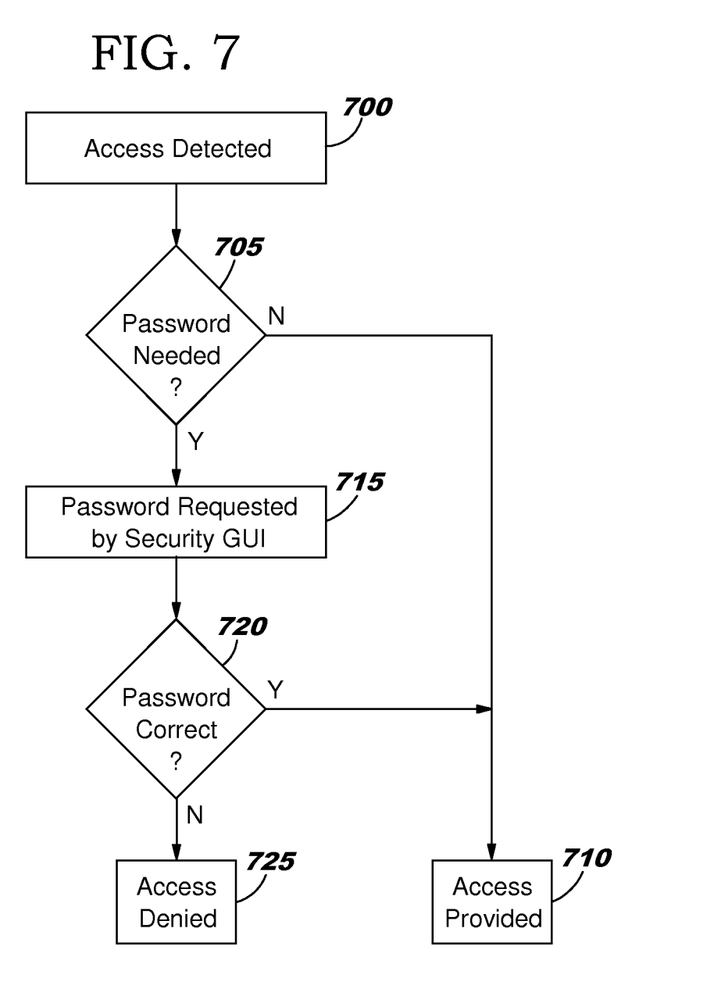
FIG. 7 is a flow diagram of the security application in operation in which various embodiments may be implemented.

FIG. 7 is a flow diagram of the security application in operation in which various embodiments may be implemented. In a first step 700, the security application detects that a secure page (e.g., application or data item) is being accessed. It is determined in step 705 whether only a general password is required and whether that password was not already provided in this user session. If no, no password is needed, then access is granted in step 710 including any decryption needed. If yes, a password is needed, then processing continues to step 715.

In step 715, the security GUI is invoked to generate a password query for user input such as described above with reference to FIG. 4B. Once the user provides a password, then in step 720 it is determined whether the user provided a valid password. If no, then access is denied in step 725 and processing ceases. Such a denial can include an explanation of the denial and an opportunity for the user to attempt the password again. If the correct password is provided, then processing returns to step 710, thereby providing access to the secure application or data item is provided including any decryption needed.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for securing sensitive information with password protection. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for securing executable software applications that utilize sensitive information comprising:

utilizing a processor to provide a user interface (UI) on a display allowing a user to select an executable software first application from a set of executable software applications as password protected on a device wherein the set of executable software applications are accessible by an operating system for execution by a processor on the device;

responsive to the user utilizing the UI to select the first application as password protected, providing a security application accessible with a first password to manage user access to the selected first application, and receiving a second password specific to the selected first application from the user to use in protecting the selected first application, wherein the first application is subsequently hidden from view of the user until the user has successfully provided the first password to the security application;

responsive to the user subsequently providing the first password for the security application, allowing the user to view the first application for selection; and responsive to the user selecting the viewed first application, requiring entry of the second password before executing the first application on the device;

wherein the user must provide the first password for the security application prior to the user selecting the first application as password protected; wherein more than one application may be selected; wherein the user interface includes a user selectable security feature for each application selected; and wherein the user selectable security feature is selected from the group of providing a specific password for the application and encrypting the application.

2. The method of claim 1 wherein a symbol overlay is added to an icon of a selected application.

3. The method of claim 1 wherein the device is a mobile device selected from a group consisting of a smartphone, a personal digital assistant, a tablet, a laptop, and a notebook.

4. The method of claim 1 wherein the security application is a layer provided between an interface of the OS and the application.

5. A computer usable program product comprising a non-transitory computer usable storage medium including computer usable code for use in securing pages that contain sensitive information, the computer usable program product comprising code for performing the steps of:

utilizing a processor to provide a user interface (UI) on a display allowing a user to select an executable software first application from a set of executable software applications as password protected on a device wherein the set of executable software applications are accessible by an operating system for execution by a processor on the device;

responsive to the user utilizing the UI to select the first application as password protected, providing a security application accessible with a first password to manage user access to the selected first application, and receiving a second password specific to the selected first application from the user to use in protecting the selected first application, wherein the first application is subsequently hidden from view of the user until the user has successfully provided the first password to the security application;

and responsive to the user subsequently providing the first password for the security application, allowing the user to view the first application for selection; and responsive to the user selecting the viewed first application, requiring entry of the second password through the before executing the first application on the device;

wherein the user must provide the first password for the security application prior to the user selecting the first application as password protected; wherein more than one application may be selected; wherein the user interface includes a user selectable security feature for each application selected; and wherein the user selectable security feature is selected from the group of providing a specific password for the application and encrypting the application.

6. The computer usable program product of claim 5 wherein a symbol overlay is added to an icon of a selected application.

7. A data processing system for securing pages that contain sensitive information, the data processing system comprising:

a processor; and a memory storing program instructions which when executed by the processor execute the steps of:

utilizing the processor to provide a user interface (UI) on a display allowing a user to select an executable software first application from a set of executable software applications as password protected on a device wherein the set of executable software applications are accessible by an operating system for execution by a processor on the device;

responsive to the user utilizing the UI to select the first application as password protected, providing a security application accessible with a first password to manage user access to the selected first application, and receiving a second password specific to the selected first application from the user to use in protecting the selected first application, wherein the first application is subsequently hidden from view of the user until the user has successfully provided the first password to the security application;

responsive to the user subsequently providing the first password for the security application, allowing the user to view the first application for selection; and responsive to the user selecting the viewed first application, requiring entry of the second password before executing the first application on the device;

wherein the user must provide the first password for the security application prior to the user selecting the first application as password protected; wherein more than one application may be selected; wherein the user interface includes a user selectable security feature for each application selected; and wherein the user selectable security feature is selected from the group of providing a specific password for the application and encrypting the application.

8. The data processing system of claim 7 wherein the data processing system is a mobile device selected from a group consisting of a smartphone, a personal digital assistant, a tablet, a laptop, and a notebook.

* * * * *